(No Model.)  G. D. HAWORTH.  2 Sheets—Sheet 1.
CHECK ROWER.
No. 353,136.  Patented Nov. 23, 1886.
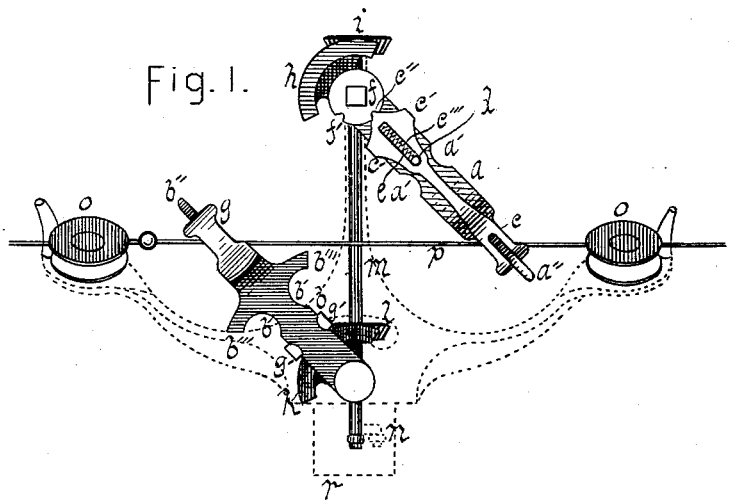
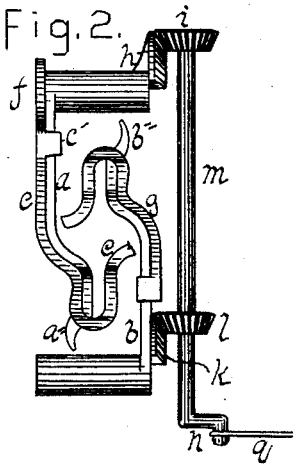
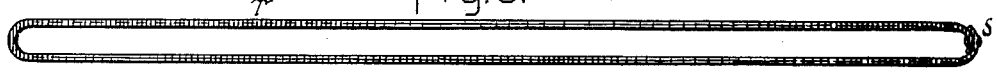
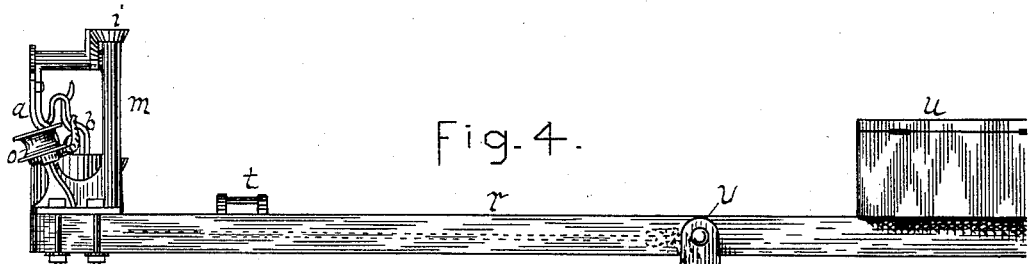
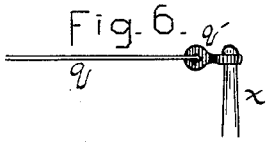
ATTEST
C. C. Clark
J. N. Bills
INVENTOR
George D. Haworth
By L. P. Graham
Attorney (No Model.) 2 Sheets—Sheet 2.
G. D. HAWORTH.
CHECK ROWER.
No. 353,136. Patented Nov. 23, 1886.
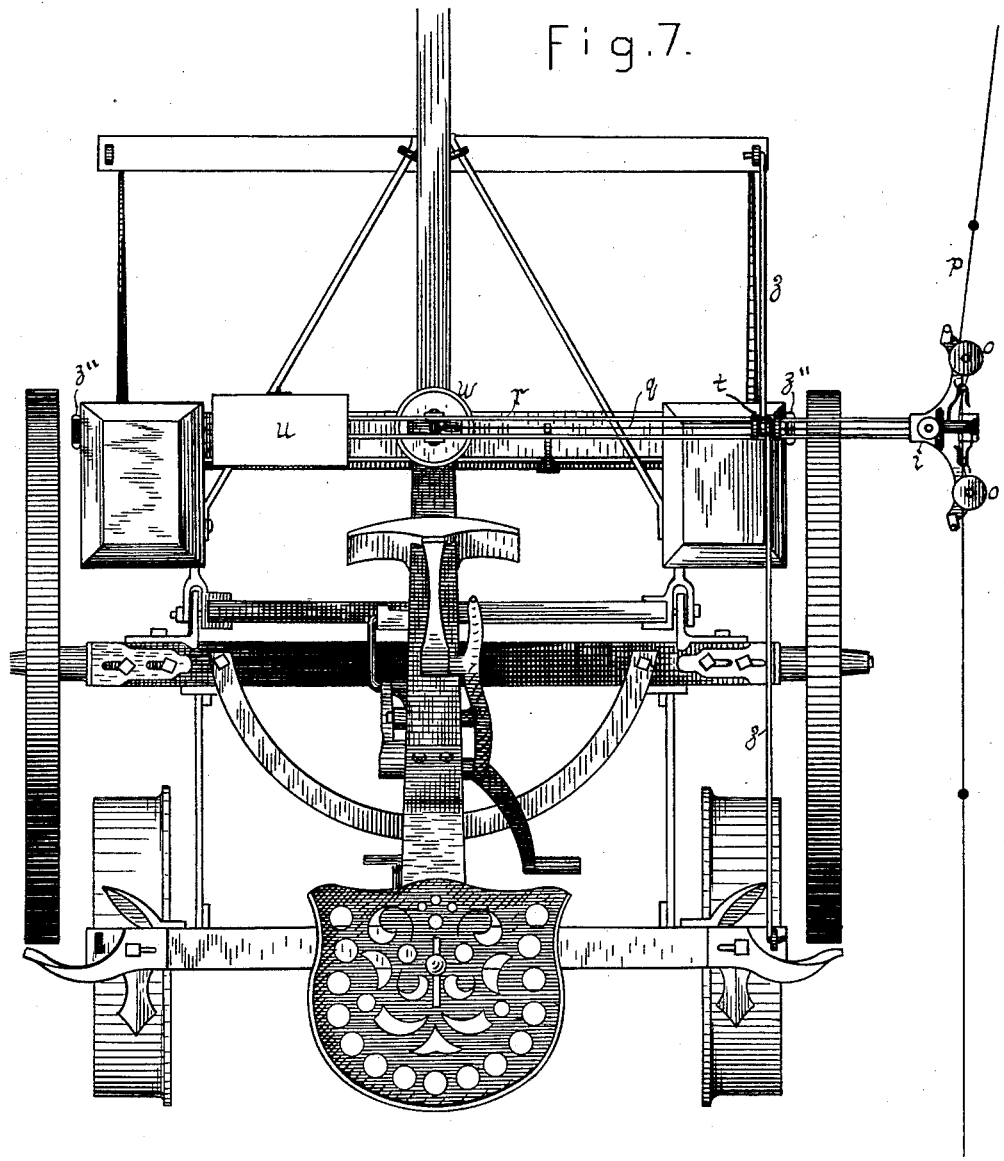
ATTEST
C. C. Clark
J. A. Bills.
INVENTOR
George D. Haworth
By L. P. Graham
Atty.

UNITED STATES PATENT OFFICE.

GEORGE D. HAWORTH, OF DECATUR, ILLINOIS.

CHECK-ROWER.

SPECIFICATION forming part of Letters Patent No. 353,136, dated November 23, 1886.

Application filed September 16, 1886. Serial No. 213,651. (No model.)

*To all whom it may concern:*

Be it known that I, GEORGE D. HAWORTH, of the city of Decatur, county of Macon, and State of Illinois, have invented certain new and useful Improvements in Check-Rowers for Corn-Planters, of which the following is a specification.

My invention consists in certain details of construction and combinations of parts, as hereinafter set forth and claimed, and relates specifically to the construction of the check-row bar, to the mechanism that, operated by the resistance of the stops on a check-row line, conveys motion to the seed-slide of a corn-planter, and to the means that enables the check-row mechanism on one side of the planter to be dispensed with and the planter to be turned at the ends of the field without detaching the line from the check-rower.

In the drawings accompanying and forming a part of this specification, Figure 1 is a face elevation of the mechanism commonly known as the "check-rower movement," and which, operated by the resistive force of the stops on a check-row line, imparts motion with more or less directness to the seed-slide of a corn-planter. Fig. 2 is a side elevation of the mechanism shown in Fig. 1. Fig. 3 is a plan of the check-row bar. Fig. 4 is a side elevation of the complete check-rower. Figs. 5 and 6 are details, which will be hereinafter explained. Fig. 7 is a plan of a corn-planter with the check-rower in position thereon.

The movement of the check-rower consists of a pair of reversely-conformed and reversely-arranged arms having simultaneous oscillation to an equal extent in contrary directions, each arm being composed of a lever having a deflected outer termination, and a dog having motion longitudinally on the lever, and forming with the lever a centripetal bifurcation—*i. e.*, a bifurcation tending toward the center of the circle the arm would describe if rotated on its fulcrum. The center of motion of each arm is on the vertical line. One is pendulously supported, the other the reverse, and they move in parallel planes. The bifurcations of the arms are in the same vertical plane. They are in alignment with the check-row line when in operation, and when the arms are in a vertical position they tend toward one another, and form, for all practical purposes, a continuous slot.

The check-row bar consists in a continuous strip of metal, forming two parallel lines, and is preferably made by bending a bar into the proper form and joining the ends thereof.

The means whereby the planter may be turned at the ends of the field without detaching the line from the check-rower, and whereby a portion of the mechanism may be dispensed with, consists in a check-row movement pivoted to the planter in a manner permitting its use on either side thereof, as will be hereinafter specified in detail.

The upper lever is indicated by reference-letter $a$, and the lower lever by the letter $b$.

$a'$ represents lateral depressions in lever $a$, which permit the ready attachment of the dog.

$a''$ represents a curved and diminished outer termination of lever $a$, which co-operates with the dog to permit the passage of the stops on the check-row line.

$b'$ represents lateral depressions of lever $b$, and $b''$ represents a curved and diminished termination of the lever, said depressions and termination being identical in function with the corresponding conformations, $a'$ and $a''$, of lever $a$.

$b'''$ represents lateral projections on lever $b$, in line with its motion, and of suitable size and conformation to strike a surface of the supporting-bracket (indicated in Fig. 1 by dotted lines) and stop the motion of the arms.

$c$ represents the dog for the upper lever, slotted as shown, to fit over termination $a''$, and curved, as indicated in Fig. 2, to form with the lever a centripetal bifurcation.

$c'$ represents clips that loosely embrace the lever and that are of a size and conformation to pass readily over the lever at $a'$.

$c''$ shows a V-shaped termination of the dog.

$c'''$ indicates a longitudinal slot in dog $c$, near the upper end thereof.

$d$ is a pin of the lever $a$, which projects through the slot of the dog.

$e$ is a spring in slot $c'''$, one end of which rests against the dog and the other against the pin of the lever.

$f$ is a non-rotative washer having V-shaped peripheral incisions $f''$, in line with the extreme positions of the arm.

*g* is the dog for the lower lever, which corresponds in general construction with dog *c*, except that it has no V-shaped terminatation, and the slot corresponding with slot *c'''* is shorter and minus the spring.

*h* represents a segmental gear rigid with the upper portion of the upper arm, concentric with the fulcrum thereof and in mesh with pinion *i*.

*k* represents a segmental gear rigid with the lower arm at a point above its fulcrum, concentric with said fulcrum and in mesh with pinion *l*.

*m* is a shaft on which pinions *i* and *l* are rigidly mounted.

*n* is a crank on the lower termination of shaft *m*.

*o* are guide-pulleys for the check-row line, both of the class known as "receiving-pulleys"—that is, capable of guiding the line to the arms.

*p* represents the check-row line, constructed in any suitable manner and provided at regular and suitable intervals with knots, stops, or buttons.

*q* is a rod that connects crank *n* with a lever centrally located with relation to the planter.

*q'* is a universal-joint connection between the rod and the lever. (See Fig. 6.)

*r* is the check-row bar, and *s* is the preferable point of junction for the ends thereof.

*t* is a pivotal bearing for braces *z* and *z'*.

*u* is a counterpoise on the check-row bar, preferably in the form of a tool-box.

*v* represents a pivot, on which the check row bar may be vertically swung.

*w* represents a rotating plate, on which the check-row bar may be horizontally swung, said pivot and plate combining to form a universal-joint coupling.

*w'* represents a support for the rotating plate *w*.

*x* is a lever in support *w'*, with its fulcrum on a vertical line with the pivot of the bar.

*y* is a rod designed to connect lever *x* with the seed-slide of a corn-planter.

*z z'* are braces pivoted to the check-row bar and connected in a readily-detachable manner with the frame of the planter.

*z''* are guides to determine the proper position of the bar on the planter, they also acting as auxiliary braces.

In operation the support *w'* of the check-row bar is secured to the planter-frame at the transverse center thereof on a line with the seed-boxes; the movement-bearing end of the bar is placed in a guide, *z''*, and braced by rods *z z'*, or in any suitable manner; the check-row line is placed in the arms and pulleys, as shown in Figs. 1 and 7, and the planter is drawn across the field in the customary manner. Then when an arm comes in contact with a stop on the line it is carried over to an extent approximating a quarter-revolution, and the stop escapes by carrying the dog into the position shown in Fig. 5. As one arm is carried to the rear the other arm passes to the front, their motions being simultaneous, but in opposite directions, as will readily appear from a consideration of their connections, as shown in the drawings. Each arm is operated by the stops alternately with the other, and their oscillating motion imparts intermittent rotary motion in opposite directions to the shaft *m*. The gearing is so proportioned that a throw of an arm will produce a semi-rotation in the shaft, and the position of the crank is such that it will always rest on a line with the check-row bar. The dog of the upper arm is held in an operative position by spring *e*. The dog of the lower arm is held in an operative position by gravity alone, the operative position in both cases being the nearest approach to the fulcrums of the respective levers. At the termination of every stroke projection *c''* of the upper dog is forced by the spring into an incision of the washer, thereby to a great degree neutralizing backlash. The outer end of an arm is always inclined toward the stop by which it is about to be thrown, and consequently said stop has no tendency to carry the dog outwardly on the lever until the throw is complete, when it will slide along the inclined arm and move the dog sufficiently to pass between said dog and the curved termination of the lever.

It is not necessary to detach the line from the check-rower when turning the planter at the ends of the field, as by disconnecting the check-row-bar braces from the planter the bar may remain stationary while the planter is being turned, the line, assisted perhaps to a greater or less extent by the operator, holding the bar from turning with the planter.

After the planter has been turned the braces are secured, as before, to the opposite side of the planter and the planting is resumed, as specified.

The universal-joint coupling enables the bar to be raised over obstructions while the planter is being turned; but it is obvious that in case no obstructions exist an ordinary vertical pivot will suffice.

The check-row bar is cheap, strong, and complete, no clamps are needed to hold the parallel strips in relative position, and the various parts of the check row mechanism may be readily attached.

The dogs effectually prevent the escape of the stops until the arms are completely thrown, thus insuring a uniformly-accurate operation of the check-rower, and after each throw of the arms the said dogs are returned automatically to their nearest approach to their respective fulcrums, completely closing the openings through which the stops must pass, and leaving everything in readiness for a subsequent operation.

In providing means for enabling the planter to be turned and the check-rower to be used continuously without detaching the check-row line, the peculiarly-constructed movement herein set forth is not in all respects essential, but may be modified by substituting for the two interacting levers a single reciprocating lever capable of being operated from either direction by the knots on the check-row line. In other words, the elements indispensable to produce the result above specified consist of, first, a check-row bar capable of pivoting in an approximately-horizontal plane at the transverse center of a corn-planter, and, second, a movement on the outer end of the bar consisting of a lever or levers having a reciprocating motion and adapted to be operated from either side by the knots on a check-row line.

I claim as new and desire to secure by Letters Patent—

1. A check-row bar consisting in a continuous metallic strip forming two parallel lines.

2. A check-row bar consisting in a single metallic strip having its ends joined together and forming two parallel lines.

3. A check-row bar composed of a single metallic strip bent to form two parallel lines and having its ends joined together.

4. In check-rowers, in combination, a pair of reversely-conformed and reversely-arranged arms having simultaneous oscillation in contrary directions and provided each with a centripetal bifurcation, a segmental gear on each arm concentric with the fulcrum thereof, and a shaft having pinions in mesh with the gear of the arms, as and for the purpose set forth.

5. In check-rowers, in combination, a pair of reversely-conformed and reversely-arranged arms having simultaneous oscillation in contrary directions, each arm consisting of a lever having a deflected outer termination, and a dog having motion longitudinally on the lever and forming therewith a centripetal bifurcation, as and for the purpose set forth.

6. In check-rowers, in combination, a pair of reversely-conformed and reversely-arranged arms having simultaneous oscillation in contrary direction, each arm consisting of a lever having a deflected outer termination, and a dog having motion longitudinally on the lever and forming therewith a centripetal bifurcation, a segmental gear on each arm concentric with the fulcrum thereof, and a shaft having pinions in mesh with the gear of the arms, as and for the purpose set forth.

7. In check-rowers, in combination, a pair of reversely-conformed and reversely-arranged arms having simultaneous oscillation in contrary directions, each arm consisting of a lever having a deflected outer termination, and a dog having motion longitudinally on the lever and forming therewith a centripetal bifurcation, a segmental gear on each arm concentric with the fulcrum thereof, and a crank-shaft having pinions in mesh with the gear of the arms, the radius of said pinions being equal to one-half the radius of the gear, as and for the purpose set forth.

8. In check-rowers, in combination, a pair of reversely-conformed and reversely-arranged arms having simultaneous oscillation in contrary directions, each arm consisting of a lever having a deflected outer termination, and a dog having motion longitudinally on the lever and forming therewith a centripetal bifurcation, a non-rotative washer at the fulcrum of a lever having peripheral incisions in line with the extreme positions of the arm, and a V-shaped projection on the end of the contiguous dog adapted to enter an incision at the termination of each stroke of the arms, as and for the purpose set forth.

9. In check-rowers, in combination, a pair of reversely-conformed and reversely-arranged arms having simultaneous oscillation in contrary directions, each arm consisting of a lever having a deflected outer end and a lateral contraction, and a dog having a slot to fit over the deflected outer end of the lever, and clips to pass over the contraction of the lever and embrace the lever in a manner permitting motion longitudinally thereon, the said dog forming with the lever a centripetal bifurcation, as and for the purpose set forth.

10. In check-rowers, in combination, a pair of reversely-conformed and reversely-arranged arms pivoted one above the other and having simultaneous oscillation in contrary directions, each arm consisting of a lever having a deflected outer end, and a dog having motion longitudinally on the lever and forming therewith a centripetal bifurcation, the upper arm being provided with a spring by means of which the dog is held, commonly at its nearest approach to the fulcrum of the lever, as and for the purpose set forth.

11. In check-rowers, in combination, a check-row bar adapted to pivot in an approximately-horizontal plane at the transverse center of a corn-planter, and a check-row movement on the outer end of the bar, consisting of a lever or levers having a reciprocating motion and adapted to be operated from either side by the knots on a check-row line.

12. In check-rowers, in combination, a check-row bar adapted to pivot in an approximately-horizontal plane at the transverse center of a corn-planter, a check-row movement on the outer end of the bar, consisting of a lever or levers having a reciprocating motion and adapted to be operated from either side by the knots of the check-row line, and a counterpoise on the end of the bar opposed to the check-row movement.

13. In check-rowers, in combination, a check-row bar adapted to pivot in an approximately-horizontal plane at the transverse center of a corn-planter, and a check-row movement on the outer end of the bar, consisting of a pair of reversely-conformed and reversely-arranged arms having simultaneous oscillation in contrary directions and adapted to be operated from either side by the knots of a check-row line.

14. In check-rowers, in combination, a check-row bar adapted to pivot in an approximately-horizontal plane at the transverse center of a corn-planter, a check-row movement on the outer end of the bar, consisting of an arm or arms having a reciprocating motion and adapted to be operated from either side by the knots of a check-row line, a lever having its fulcrum on a vertical line with the pivot of the bar, means for connecting the lever with the seed-slide of the planter, and a pivotal connection between the check-row movement and the lever.

15. The swinging arm adapted to be swung from side to side of the planter, with the knotted check-row line in its regular operating position, in combination with a check-row movement adapted to be operated by such knotted check-row line when operating in opposite directions in relation to said movement.

In testimony whereof I sign my name in the presence of two subscribing witnesses.

GEO. D. HAWORTH.

Attest:
GEO. S. SIMPSON,
THEO. NELSON.